(12) United States Patent
Danilak

(10) Patent No.: US 7,523,264 B1
(45) Date of Patent: Apr. 21, 2009

(54) APPARATUS, SYSTEM, AND METHOD FOR DEPENDENT COMPUTATIONS OF STREAMING MULTIPROCESSORS

(75) Inventor: Radoslav Danilak, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 456 days.

(21) Appl. No.: 11/303,770

(22) Filed: Dec. 15, 2005

(51) Int. Cl.
G06F 12/00 (2006.01)
G06F 13/00 (2006.01)
G06F 13/28 (2006.01)

(52) U.S. Cl. .................. 711/135; 711/133; 711/118

(58) Field of Classification Search ............... None
See application file for complete search history.

(56) References Cited

U.S. PATENT DOCUMENTS

| | | | |
|---|---|---|---|
| 3,675,232 A | 7/1972 | Strout | |
| 5,937,204 A | 8/1999 | Schinnerer | |
| 6,002,412 A | 12/1999 | Schinnerer | |
| 6,075,544 A | 6/2000 | Malachowsky et al. | |
| 6,078,336 A | 6/2000 | Reynolds | |
| 6,081,873 A | 6/2000 | Hetherington et al. | |
| 6,122,711 A * | 9/2000 | Mackenthun et al. | 711/135 |
| 6,148,372 A | 11/2000 | Mehrotra et al. | |
| 6,150,679 A | 11/2000 | Reynolds | |
| 6,628,292 B1 | 9/2003 | Ashburn et al. | |
| 6,769,047 B2 | 7/2004 | Kurupati | |
| 7,275,249 B1 * | 9/2007 | Miller et al. | 718/105 |
| 2004/0215944 A1 * | 10/2004 | Burky et al. | 712/244 |

OTHER PUBLICATIONS

Laplante, P.A., "A Novel Single Instruction Computer Architecture," ACM SIGARCH Computer Architecture News, vol. 18, Issue 4, Dec. 1990, pp. 22-26.

Laplante, P.A., "An Improved Conditional Branching Scheme For A Single Instruction Computer Architecture," ACM SIGARCH Computer Architecture News, vol. 19, Issue 4, Jun. 1991, pp. 66-68.

* cited by examiner

*Primary Examiner*—Kevin Verbrugge
*Assistant Examiner*—Eric S Cardwell
(74) *Attorney, Agent, or Firm*—Cooley Godward Kronish LLP

(57) ABSTRACT

An array of streaming multiprocessors shares data via a shared memory. A flushing mechanism is used to guarantee that data required for dependent computations is available in the shared memory.

20 Claims, 5 Drawing Sheets

APPARATUS, SYSTEM, AND METHOD FOR DEPENDENT COMPUTATIONS OF STREAMING MULTIPROCESSORS

FIELD OF THE INVENTION

The present invention is generally related to dependent computations. More particularly, the present invention is directed towards performing dependent computations in computing systems having a plurality of multiprocessors.

BACKGROUND OF THE INVENTION

There is increasing interest in General Purpose Graphics Processing Units (GPGPUs) that include a plurality of streaming multiprocessors. GPGPUs are GPUs that may also be used for other types of processing, such as image processing and scientific processing. Background information on GPGPUs and streaming multiprocessors are described in the book, *GPU Gems 2: Programming Techniques for High-Performance Graphics and General-Purpose Computation*, editors Matt Pharr and Randima Fernando, Pearson Education (2005), the contents of which are hereby incorporated by reference.

Advances in semiconductor technology permit a GPGPU to have a large number of computation units on a single die. As described in chapter 29 of *GPU Gems* 2, in a streaming programming model, all data is represented as a stream, where a stream is an ordered set of data of the same data type. Kernels operate on entire streams of elements. In a stream programming model, applications are constructed by chaining multiple kernels together. Since kernels operate on entire streams, stream elements can be processed in parallel using parallel multiprocessors. One model for a high performance GPU includes a task parallel organization, in that all kernels can be run simultaneously, and a data level parallelism in that data is processed in parallel computation units.

One problem associated with a highly parallel streaming multiprocessor GPGPU is handling data dependencies. Since the streaming multiprocessors are designed to perform parallel computations, they typically operate independently of each other with no significant direct communication between streaming multiprocessors to synchronize data flow between the streaming multiprocessors. However, conventional techniques to control the flow of data required for dependent calculations would require comparatively complex hardware. For example, while snooping techniques or directories might be used to monitor and control the flow of data between individual streaming multiprocessors, this would increase the cost and complexity of the GPGPU architecture.

Therefore, in light of the above described problems the apparatus, system, and method of the present invention was developed.

SUMMARY OF THE INVENTION

A computational apparatus includes an array of streaming multiprocessors to perform parallel computations. The array of streaming multiprocessors is configured to share data via a shared memory. A flush mechanism is provided to flush queues along write paths between the array of streaming multiprocessors and a shared memory in response to a flush command. The computational apparatus coordinates flushes to support dependent computations. The data flushes are coordinated to guarantee that data generated by a first streaming multiprocessor, required for a dependent computation in a second streaming multiprocessor, is available in the shared memory. In one embodiment, a signal is asserted to indicate that a computational task is completed by the first streaming multiprocessor and the flush is commanded in response to the signal.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
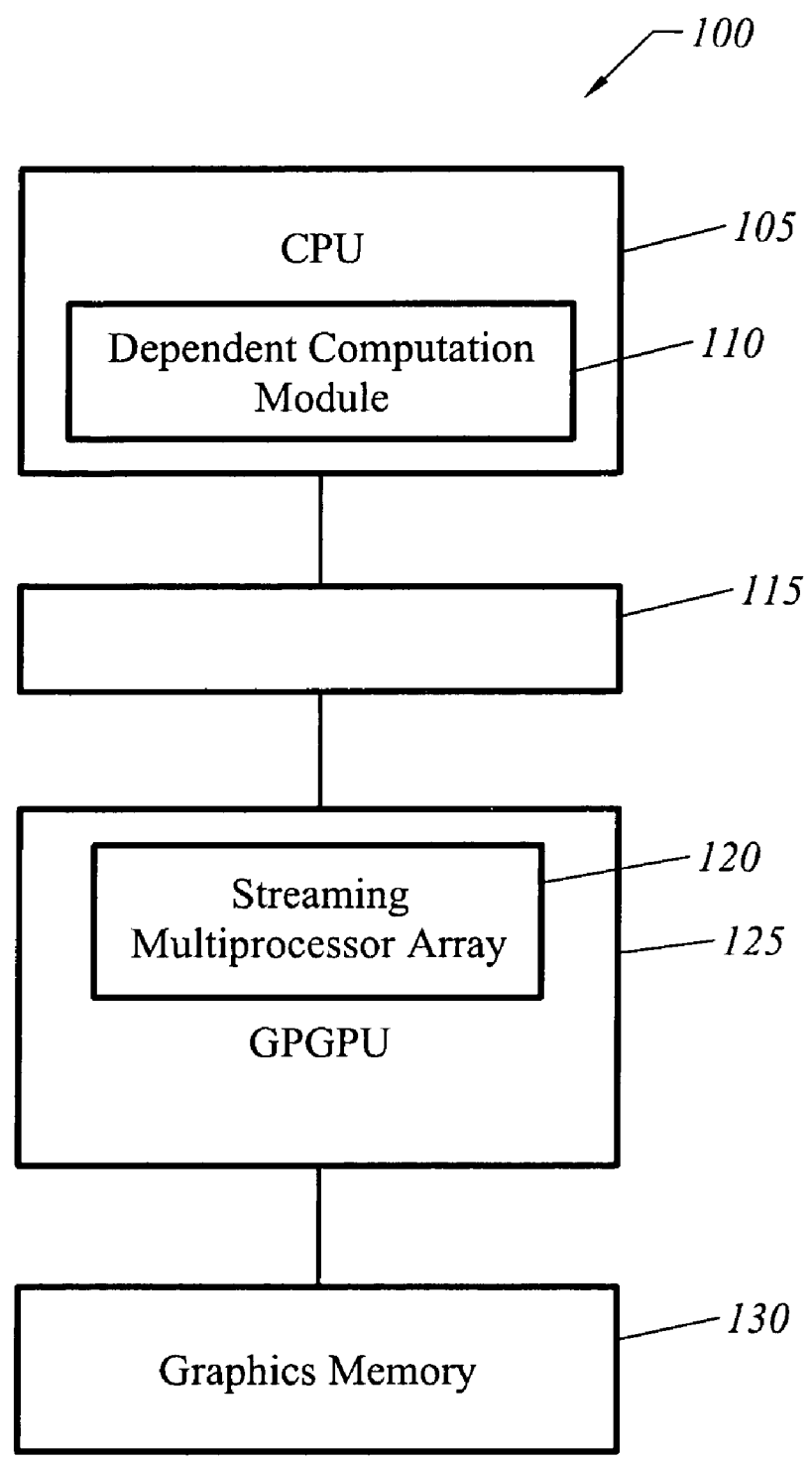
FIG. 1 is a block diagram of a computing system having a streaming multiprocessor array in accordance with one embodiment of the present invention.

FIG. 1 illustrates a computing system 100 in accordance with one embodiment of the present invention. A central processing unit (CPU) 105 supports dependent computations using a streaming multiprocessor array 120 in a general purpose graphics processing unit (GPGPU) 125. Each individual streaming multiprocessor of streaming multiprocessor array 120 executes threads that process stream elements. CPU 105 may be coupled to GPGPU 125 via a bridge 115 or other communications component. Computing system 100 includes a dependent computation software module 110 executing on CPU 105 which controls the launching of a sequence of dependent computations on GPGPU 125. GPGPU 125 is coupled to a shared memory 130, such as a frame buffer. In one embodiment GPGPU 125 supports the execution of general purpose computation, media processing, and three-dimensional graphics.

Figure 2:
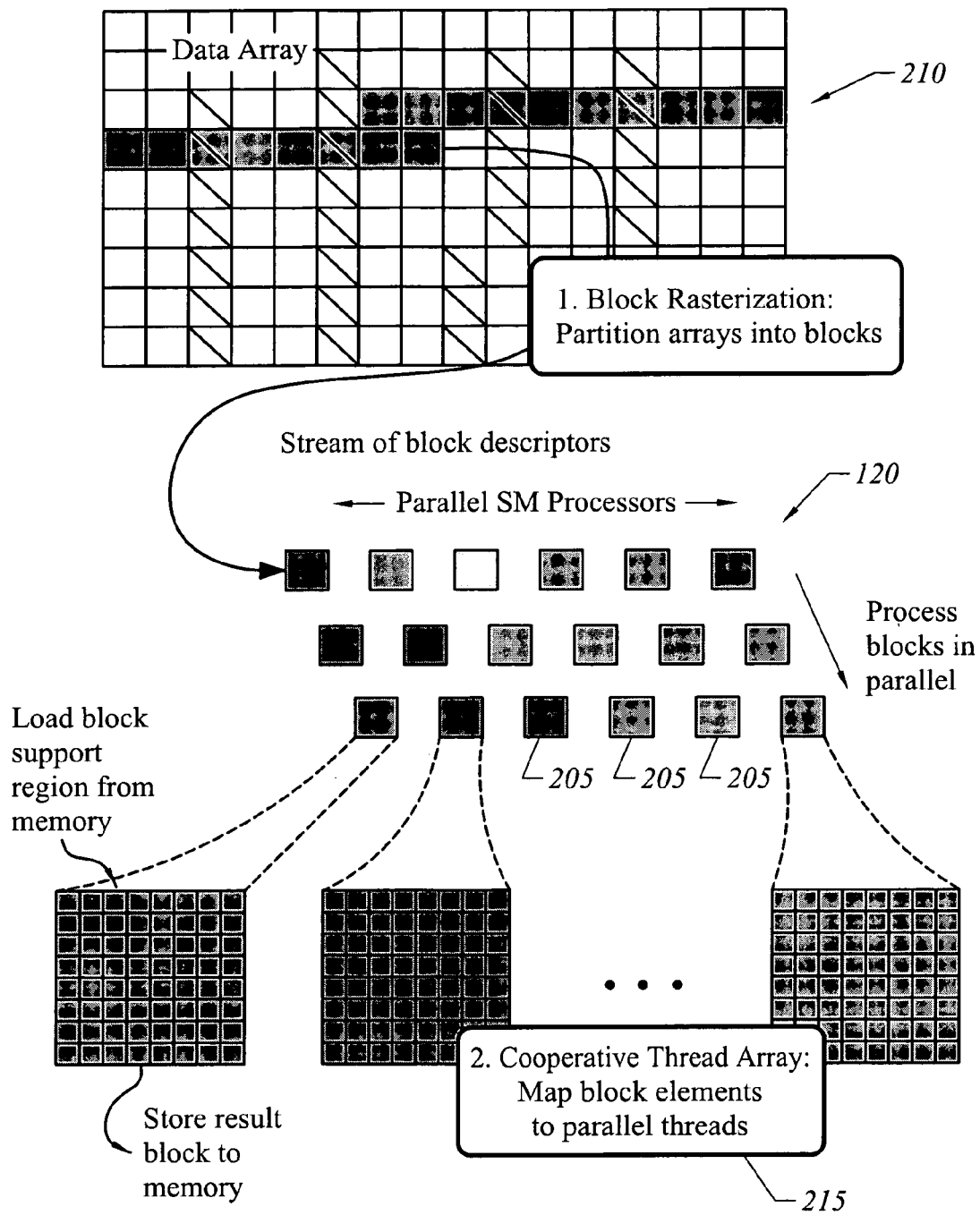
FIG. 2 is a diagram illustrating a computing model for performing parallel computations using a streaming multiprocessor array in accordance with one embodiment of the present invention.

FIG. 2 illustrates a processing model for an exemplary processing model for streaming multiprocessor array 120. In one embodiment, the architecture supports the partitioning of large data arrays 210 into blocks to be processed in parallel. The data blocks may be further partitioned into elements to be processed in parallel. Each individual streaming multiprocessor may, for example, receive a stream of data block descriptors and commands from CPU 105, including commands to launch specific computational programs performing specific computational tasks.

The streaming multiprocessors 205 are designed to operate as parallel computation units, with each streaming multiprocessor assigned a different cooperative thread array (CTA) 215 to process each block. An individual CTA 215 has at least one thread but is more generally an array of threads that execute concurrently. A CTA program specifies a mapping between data blocks and individual threads. Each thread computes one or more result elements for the block. All of the threads of a given CTA execute on the same individual streaming multiprocessor.

Computation programs are structured to run as CTAs. This permits each individual streaming multiprocessor to execute the same computation programs or different programs, depending on the implementation. A central dispatch unit (not shown) dispatches CTAs 215 from CPU 105 to individual streaming multiprocessors 205. CPU 105 also generates commands to launch the execution of a CTA on individual streaming multiprocessors.

The threads of each CTA 215 are cooperative in that threads of a CTA can share data and communicate with each other such that a CTA provides a means to execute a program in parallel by executing several threads in parallel. In one embodiment an individual CTA 215 comprises an instruction program, N instances of thread state, where N is an integer, N instances of threads concurrently executing the program, N unique per-thread identifiers, and a means for sharing data and results among the N executing threads, such as a shared memory or communication network. The cooperation and communication amongst threads of the CTA allows faster and more efficient parallel algorithms.

Figure 3:
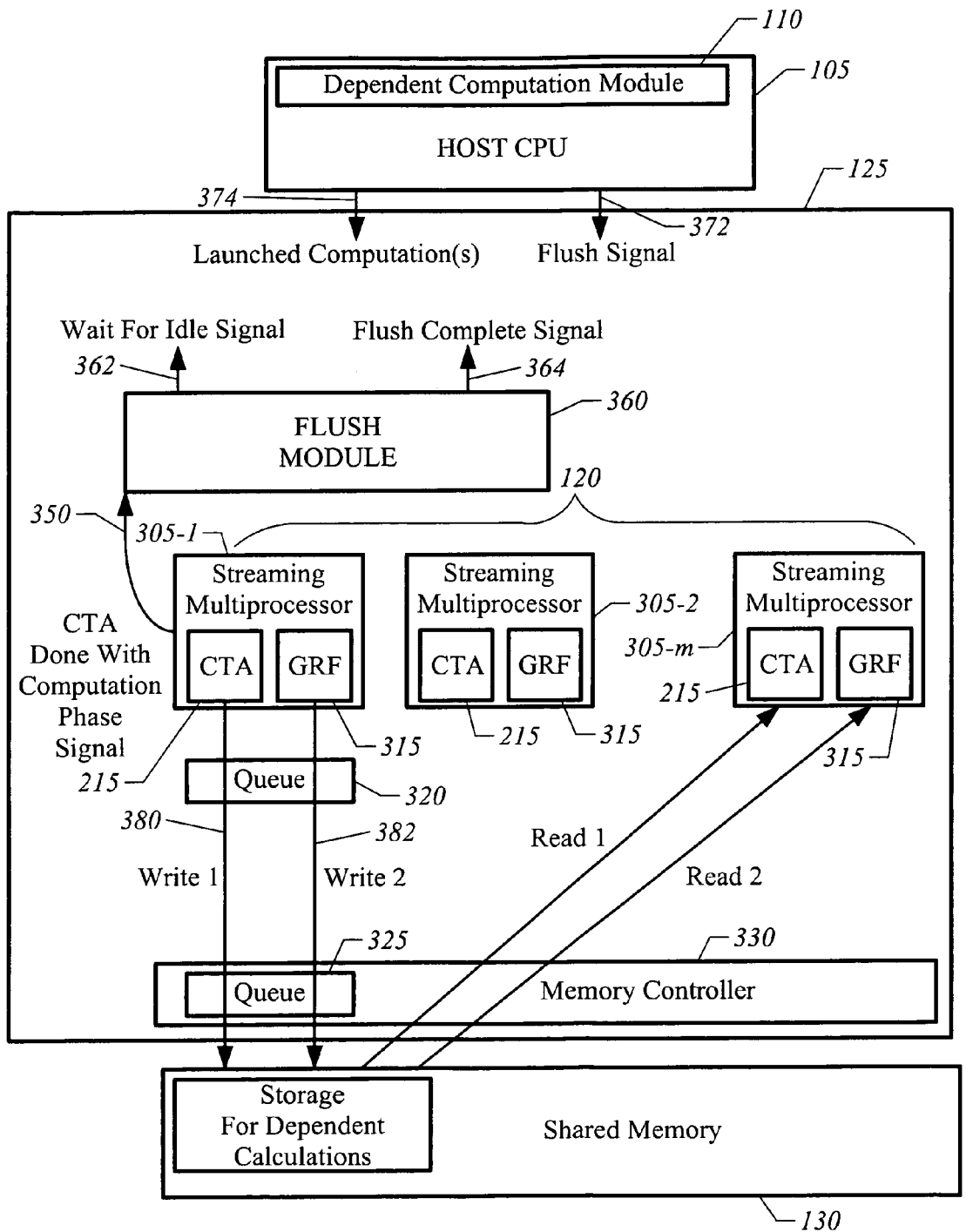
FIG. 3 is a block diagram illustrating a computing system having a multiprocessor array and a flushing mechanism for performing dependent computations in accordance with one embodiment of the present invention.

FIG. 3 is a more detailed block diagram of computing system 100 illustrating the signaling used to coordinate dependent computations between different streaming multiprocessors. Individual streaming multiprocessors 305-1, 305-2, to 305-M are provided, where M is an integer. Each individual streaming multiprocessor is assigned a CTA 215 to execute a program and has a global register file 315 that is accessible by the CTA threads. The global register file permits threads within an individual CTA 215 to share data.

Each individual streaming multiprocessor 305-1, 305-2, to 305-M is designed to operate as an independent computation unit in order to support parallel computation and consequently has at most only limited communication with the other streaming multiprocessors. Consequently, one technique to perform dependent computations using different streaming multiprocessors is through a sequence of read and write operations using shared memory 130. That is, different streaming multiprocessors, such as streaming multiprocessors 305-1 and 305-M, share data via shared memory 130. An individual streaming multiprocessor 305-1 is assigned a computation task by CPU 105 based, in part, on the CTA program associated with the streaming multiprocessor. This may result in one or more writes of resultant data to shared memory 130, such as Write 1 and Write 2. Another streaming multiprocessor, such as streaming multiprocessor 305-M, is assigned a dependent computation task based on the results of Write 1 or Write 2. To perform the dependent computation, streaming multiprocessor 305-M performs one or more read operations, such as Read 1 and Read 2, to shared memory 130.

The write paths 380 and 382 for Write 1 and Write 2 may, for example, go through a memory controller 330. The memory controller may have an associated queue 325. Additionally, there may be other queues, such as queue 320, along the write paths 380 and 382. As a result, an individual write operation can become delayed in an individual queue 320 or 325. Moreover, the delays may not be uniform such that a sequence of write operations can enter shared memory 130 in an order different than the execution order. For example, Write 1 can be issued earlier than Write 2 but become stalled in queue 320 such that Write 2 enters shared memory 130 before Write 1. Thus, in order to efficiently perform dependent computations a mechanism is required to guarantee that the data generated by streaming multiprocessor 305-1 is present at an appropriate time in shared memory 130 when streaming multiprocessor 305-M requires the data to perform a dependent computation.

In one embodiment, a flushing mechanism is used to guarantee that data required for dependent calculations reaches shared memory 130 before a dependent computation is performed. A flush module 360 is provided to support flushing of queues along write paths 380 and 382. Flushing techniques are well known in the computational arts to flush queues along a path to memory. Flushing techniques are used, for example, in some memory controllers to clean buffers of data. In the present invention, however, the flushing is coordinated in response to a signal 350 generated by GPGPU 125 indicative that a computational phase is completed in an individual streaming multiprocessor 305-1 that is used to generate data for dependent computations.

In one embodiment, host CPU 105 initiates a flush after receiving a "wait for idle" signal 362. A wait for idle signal is a conventional signal class that CPUs are designed to receive and is thus comparatively simple to implement. However, more generally other types of signals may be used to indicate that an individual streaming multiprocessor 305-1 has completed a computational phase. In one embodiment, flush module 360 generates the wait for idle signal 362 in response to signal 350. However, in one embodiment signal 350 corresponds to the wait for idle signal 362 and is generated directly by an individual CTA.

In response to the wait for idle signal 362, CPU 105 issues a flush command signal 372. The flush command signal 372 triggers flush module 360 to flush data in queues 320 and 325 along write paths 380 and 382. As a result, any data stalled along write paths 380 and 382 enters shared memory 130. Flush module 360 generates a flush complete signal 364 to indicate to CPU 105 that flushing is complete. CPU 105 then launches 374 the next phase of computation, such as a phase of computation in which streaming multiprocessor 305-M performs a dependent computation.

Figure 4:
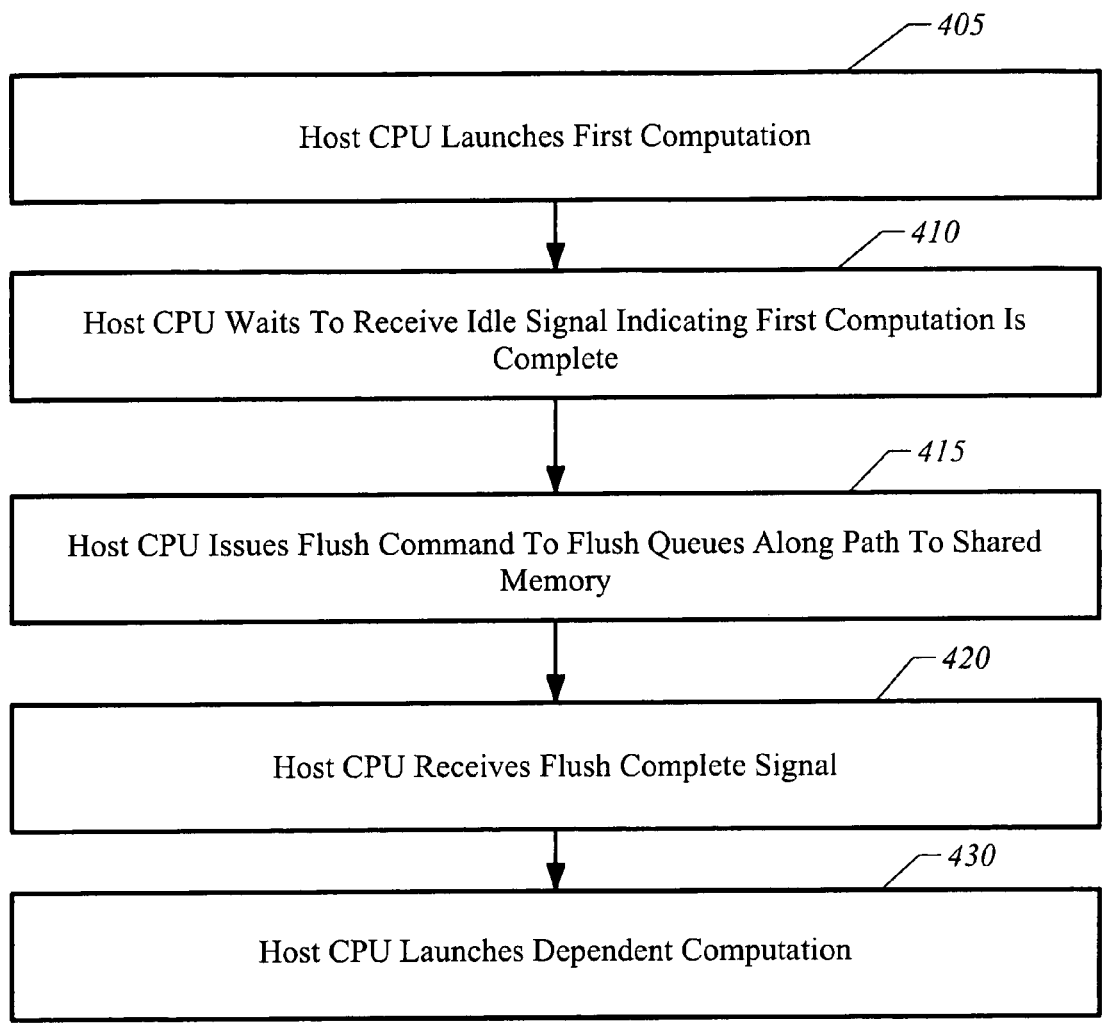
FIG. 4 is a flow chart illustrating a method for performing dependent computations in accordance with one embodiment of the present invention.

FIG. 4 illustrates actions occurring at CPU 105. The host CPU launches 405 a first computation on a first streaming multiprocessor. The host CPU waits to receive 410 the idle signal indicating that the first phase of computation has been completed. The host CPU then issues 415 a flush command to flush queues along write paths to shared memory. The host CPU waits to receive 420 a flush complete signal. In response to the flush complete signal, the host CPU launches 430 the dependent computation on a second streaming multiprocessor.

Figure 5:
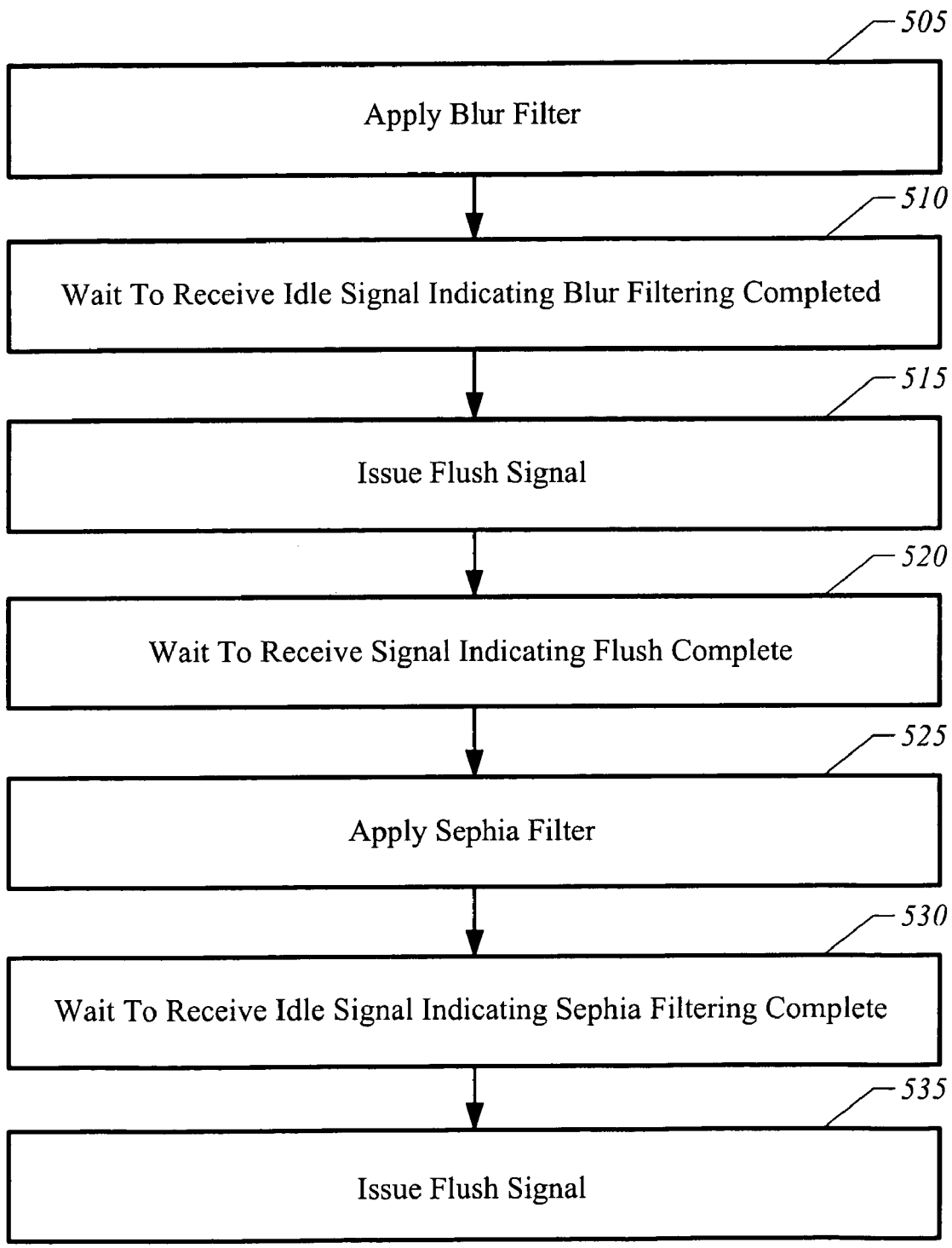
FIG. 5 is a flow chart illustrating an exemplary sequence of dependent image processing computations in accordance with one embodiment of the present invention.

FIG. 5 illustrates an exemplary process flow in which two different CTAs 215 perform different dependent processing operations. As an illustrative example, image processing operations are often performed as dependent computations. Consider, for example, blur filtering and sephia filtering. The host CPU launches a first computation corresponding to applying 505 a blur filter. The host CPU waits to receive 510 an idle signal indicating that the blur filtering is completed. The host CPU issues 515 a flush signal. The host CPU waits to receive a flush complete signal 520. The host CPU then launches a second computation corresponding to applying a sephia filter 525. Assuming that there are other dependent computations to be performed, the host CPU then waits to receive 530 an idle signal indicating that sephia filtering is completed and then issues 535 a flush signal.

One benefit of the present invention is that it provides a cost-effective means to support dependent computations in a system having an array of streaming multiprocessors. Conventional techniques to monitor and control the flow of data required for dependent calculations require comparatively complex hardware, such as snooping hardware, that would increase the cost and complexity of the GPGPU architecture. In contrast, the present invention requires only a minor modification of CPU software and conventional flushing hardware to support dependent computations. As a result, dependent computations are supported in a GPGPU in a cost effective manner.

While an embodiment has been described in which the CPU generates the flush command signal 372, more generally it is contemplated that flushing may be coordinated by a GPGPU 125 using other techniques as well. For example, the GPGPU could be modified to internally generate a flush command signal after a computational task has been completed by an individual streaming multiprocessor 305-1 and then reports to CPU 105 that a flush has been completed. However, an implementation in which GPGPU 125 sends a signal 362 to CPU 105 and CPU 105 generates a flush command 372 has the benefit that it is comparatively simple, facilitates the coordination of flushing with other CPU activities, and is also compatible with conventional flushing mechanisms.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for performing dependent computations, comprising:
   an array of streaming multiprocessors to perform parallel computations, said array of streaming multiprocessors configured to share data via a shared memory; and
   a flush mechanism operative to flush queues along write paths between said array of streaming multiprocessors and said shared memory in response to a flush command;
   dependent computations being performed via a sequence in which a first streaming multiprocessor performs a first computational task and writes resultant data to the shared memory in one or more writes and a second streaming multiprocessor reads the resultant data from the shared memory and performs a second computational task dependent on the resultant data from the first computational task, said apparatus coordinating flushes to guarantee that the resultant data generated by the first streaming multiprocessor required for a dependent computation in the second streaming multiprocessor is available in said shared memory to be read by said second streaming multiprocessor.

2. The apparatus of claim 1, wherein said apparatus sends a signal to a host central processing unit (CPU) indicating said first streaming multiprocessor has completed a computational task and said apparatus receives said flush command from said CPU.

3. The apparatus of claim 2, wherein said apparatus sends a flush complete signal to said CPU upon the completion of a flush.

4. The apparatus of claim 3, wherein said apparatus receives a command from said CPU to launch said dependent computation on said second streaming multiprocessor in response to said CPU receiving said flush complete signal.

5. The apparatus of claim 1, wherein said apparatus includes a memory controller and associated queues along write paths.

6. The apparatus of claim 1, wherein each of said streaming multiprocessors executes a thread array.

7. The apparatus of claim 6, wherein said thread array is a cooperative thread array in which threads of a particular thread array share data and communicate with other threads assigned to the same thread array.

8. The apparatus of claim 2, wherein said signal is an idle signal.

9. The apparatus of claim 8, wherein a thread array issues said idle signal.

10. A general purpose graphics processing unit (GPGPU) for performing dependent computations, comprising:
   an array of streaming multiprocessors to perform parallel computations, said array of streaming multiprocessors configured to share data via a shared memory accessible by read operations and write operations;
   a flush mechanism operative to flush queues along write paths between said array of streaming multiprocessors and said shared memory in response to a flush command from a host central processing unit (CPU);
   a memory controller for accessing said shared memory; and
   at least one queue along each write path between individual streaming multiprocessors and said shared memory;
   said general purpose graphics processing unit issuing a first signal to said CPU indicative of a need to perform a flush of the results of a first computational task into shared memory and a second signal indicative of a completion of a flush;
   dependent computations being performed via a sequence in which a first streaming multiprocessor performs the first computational task and writes resultant data to the shared memory in one or more writes and a second streaming multiprocessor reads the resultant data from the shared memory and performs a second computational task dependent on the resultant data from the first computational task;

the flush being coordinated to guarantee that the resultant data generated by the first streaming multiprocessor required for a dependent computation in the second streaming multiprocessor is available in said shared memory to be read by said second streaming multiprocessor.

11. The GPGPU of claim 10, wherein each of said streaming multiprocessors executes a thread array.

12. The GPGPU of claim 11, wherein said thread array is a cooperative thread array in which a thread array shares data and communicates with other threads assigned to the same thread array.

13. The GPGPU of claim 10, wherein said first signal is an idle signal.

14. The GPGPU of claim 10, wherein an individual streaming multiprocessor issues the first signal indicating that the computational task has been completed.

15. The GPGPU of claim 10, wherein said general purpose graphics processing unit issues said first signal in response to the completion of a computational task generating data required for a dependent computation.

16. A method for performing dependent computations using an array of streaming multiprocessors, comprising:

assigning a first computational task to a first streaming multiprocessor, said first streaming multiprocessor writing a result of said first computational task to a shared memory;

receiving a signal indicating that said first streaming multiprocessor has completed said first computational task;

generating a flush command to flush data along write paths to said shared memory;

receiving confirmation that a flush has been completed; and launching a second computational task on a second streaming multiprocessor, the second streaming multiprocessor reading the shared memory, to obtain the result from the first computational task for use in the second computational task;

the flush being coordinated to guarantee that the resultant data generated by the first streaming, multiprocessor required for a dependent computation in the second streaming multiprocessor is available in said shared memory to be read by said second streaming multiprocessor.

17. The method of claim 16, wherein said receiving a signal comprises receiving an idle signal.

18. The method of claim 17, wherein said first streaming multiprocessor generates said signal.

19. The method of claim 16, wherein said writing comprises utilizing write paths including data queues and a memory controller to write data to said shared memory.

20. The method of claim 17, wherein first computational task is a first filter and said second computational task is a second filter.

* * * * *